United States Patent
Zhao et al.

(10) Patent No.: US 10,071,910 B2
(45) Date of Patent: Sep. 11, 2018

(54) METHODS AND SYSTEMS FOR PRODUCING CARBON AEROGEL

(71) Applicant: EAST CHINA UNIVERSITY OF SCIENCE AND TECHNOLOGY, Shanghai (CN)

(72) Inventors: Chongjun Zhao, Shanghai (CN); Jianbo Dong, Shanghai (CN); Youfu Huang, Shanghai (CN); Jingwei Ma, Shanghai (CN); Xiuzhen Qian, Shanghai (CN)

(73) Assignee: EAST CHINA UNIVERSITY OF SCIENCE AND TECHNOLOGY, Shanghai (CN)

( * ) Notice: Subject to any disclaimer, the term of this patent is extended or adjusted under 35 U.S.C. 154(b) by 33 days.

(21) Appl. No.: 15/033,002

(22) PCT Filed: Oct. 31, 2013

(86) PCT No.: PCT/CN2013/086331
§ 371 (c)(1),
(2) Date: Apr. 28, 2016

(87) PCT Pub. No.: WO2015/062029
PCT Pub. Date: May 7, 2015

(65) Prior Publication Data
US 2016/0244332 A1  Aug. 25, 2016

(51) Int. Cl.
*C01B 31/02* (2006.01)
*C01B 31/00* (2006.01)
*B01J 13/00* (2006.01)

(52) U.S. Cl.
CPC .......... *C01B 31/02* (2013.01); *B01J 13/0052* (2013.01); *C01B 31/00* (2013.01); *C01B 31/0206* (2013.01); *C01P 2004/64* (2013.01); *C01P 2006/12* (2013.01); *C01P 2006/16* (2013.01)

(58) Field of Classification Search
CPC ..................................................... C01B 31/02
See application file for complete search history.

(56) References Cited

U.S. PATENT DOCUMENTS 6,064,560 A    5/2000 Hirahara et al.
2003/0134916 A1    7/2003 Hrubesh

OTHER PUBLICATIONS

Fu et al., 'Studies of the Chemical and Pore Structure of the Carbon Aerogels Synthesized by Gelation and Supercritical Drying in Isopropanol' in J. Applied Polymer Science, vol. 91 pp. 3060-3067 (2004).*
Chowdhury "Carbon Aerogel—The Lightest Material," accessed at http://supersciencebydiva.blogspot.com.au/2013/05/carbon-aerogel-lightest-material.html, accessed on Jul. 29, 2013, pp. 3.
International Search Report and Written Opinion for International Application No. PCT/CN2013/086331 dated Jul. 22, 2014.
Tonanon., N., et al., "Improvement of mesoporosity of carbon cryogels by ultrasonic irradiation," Carbon, vol. 43, Issue 3, pp. 525-531 (Jan. 2005).
Zani., A., et al., "Ultra-low density carbon foams produced by pulsed laser deposition," Carbon, vol. 56, pp. 358-365 (May 2013).

* cited by examiner

*Primary Examiner* — Stuart Hendrickson

(57) ABSTRACT

Methods described herein generally relate to producing carbon aerogel. The method may include providing a carbon-containing polymeric material, and contacting the carbon-containing polymeric material with light, heat or both to produce the carbon aerogel. Systems and kits for producing carbon aerogel are also disclosed.

21 Claims, 12 Drawing Sheets

METHODS AND SYSTEMS FOR PRODUCING CARBON AEROGEL

CROSS-REFERENCE TO RELATED APPLICATION

This application is a U.S. national stage filing under 35 U.S.C. § 371 of PCT International Application No. PCT/CN2013/086331 filed on Oct. 31, 2013.

BACKGROUND

Unless otherwise indicated herein, the materials described in this section are not prior art to the claims in this application and are not admitted to be prior art by inclusion in this section.

Carbon aerogels are highly porous solids that are extremely lightweight. Carbon aerogels have a fully adjustable three-dimensional structure and can provide high surface areas. The addition of dopants can also tune the aerogel's electrical, thermal, and mechanical properties.

Carbon aerogels can be used in a variety of applications, including but not limited to insulation, conduction, convection and radiation of heat, and manufacture of batteries and supercapacitors, electrocatalysis, capacitative deionization, oil spill controllers, and solar energy collectors.

Current methods for producing carbon aerogel include using resorcinol and formaldehyde as starting materials. In these methods, resorcinol and formaldehyde may be reacted in the presence of a basic catalyst, and the subsequent product can be supercritically dried in carbon dioxide to produce an organic aerogel. The organic aerogel can then be pyrolyzed under high temperatures in the presence of an inert gas to produce carbon aerogel. One of the disadvantages of this method is the need for a basic catalyst. If the catalyst concentration is relatively high, the gel may undergo significant contraction during both supercritical drying and carbonization, thereby increasing the difficulty in obtaining carbon aerogel having a low weight density. On the other hand, if the catalyst concentration is relatively low, the gel may not be formed. In addition, the method is complicated and expensive to perform, and difficult to control, particularly on a large scale. The method also requires a long preparation period and involves expensive starting materials. Despite the promising market applications of carbon aerogel, market acceptance and industrialization of carbon aerogel have been hindered because of the high cost and low yield obtained from the current methods of producing carbon aerogel. Therefore, it will be desirable to provide methods and systems for producing carbon aerogels that can at least ameliorate or overcome these disadvantages.

SUMMARY

Some embodiments disclosed herein describe methods of producing carbon aerogel. The methods can include providing a carbon-containing polymeric material; and contacting the carbon-containing polymeric material with light, heat or both to produce carbon aerogel. In some embodiments, the method further includes collecting the carbon aerogel.

Some embodiments disclosed herein describe systems for producing carbon aerogel. The systems can include at least one energy source configured to emit light, heat or both; and an enclosure configured to receive at least one carbon-containing polymeric material, and light, heat or both from the energy source, to expose the at least one carbon-containing polymeric material to the light, heat or both.

Some embodiments disclosed herein describe kits for producing carbon aerogel. The kits can include at least one energy source configured to emit light, heat or both; an enclosure containing at least one carbon-containing polymeric material, the enclosure configured to receive light, heat or both from the energy source to expose the at least one carbon-containing polymeric material to the light, heat or both; and instructions for contacting the at least one carbon-containing polymeric material with the light, heat or both to produce the carbon aerogel.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
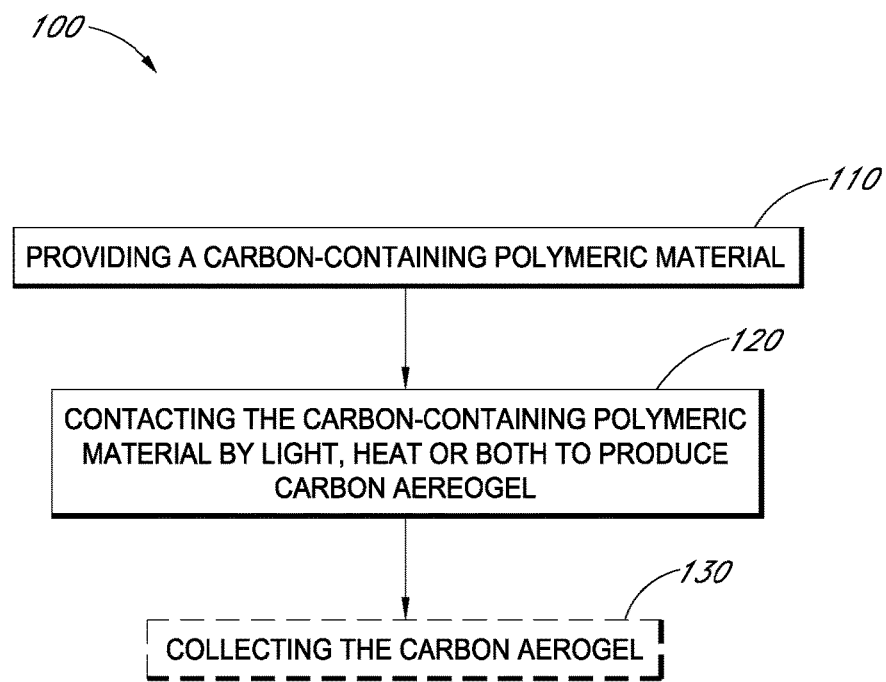
FIG. 1 is a flow diagram illustrating a non-limiting example of a method of producing carbon aerogel.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Carbon aerogel is a lightweight, porous, amorphous, block-shaped nanocarbon material having a continuous three-dimensional porous structure. The average size and density of the pores can be controlled dimensioned on a nanometer scale. Carbon aerogels can be in various forms, for example, monoliths, composites, thin films, granular and powders. Monolithic carbon aerogel can have good transparency and structural strength, but the production of such aerogels can be time-consuming and can lead to aerogels that can have decreased mechanical performance (for example, due to formation of cracks). Carbon aerogels in granular or powdered form can be easily integrated into other materials, including materials for special applications such as electrode materials for energy storage devices (such as lithium ion batteries) and catalysts.

Disclosed herein are methods, systems and kits for producing carbon aerogel. The carbon aerogels produced by the methods, systems or kits disclosed herein can be in various forms, such as granular form, powdered form, or a mixture thereof. In some embodiments, the carbon aerogel disclosed herein includes carbon aerogel powder. In some embodiments, the carbon aerogel disclosed herein includes carbon aerogel granules. The carbon aerogel power or granules can include carbon nanoparticles.

Method for Producing Carbon Aerogel

The present disclosure, in some embodiments, describes methods related to producing carbon aerogels, for example powdered or granular carbon aerogels. The methods described herein can be energy-saving, environmentally friendly, and quick and easy to perform. The methods disclosed herein do not require complex equipment and can have shortened preparation periods as compared to conventional methods of preparation. In addition, the methods disclosed herein do not require pre-treatment of starting materials, are easy to carry out, and do not require post-processing of the products.

The method of producing carbon aerogel, in some embodiments, includes providing a carbon-containing polymeric material; and contacting the carbon-containing polymeric material with light, heat or both to produce the carbon aerogel. In some embodiments, the method further includes collecting the carbon aerogel.

A non-limiting example of the method 100 of producing carbon aerogel in accordance with the present disclosure is illustrated in the flow diagram shown in FIG. 1. As illustrated in FIG. 1, method 100 can include one or more functions, operations, or actions as illustrated by one or more of operations 110-130.

Method 100 can begin at operation 110, "Providing a carbon-containing polymeric material." Operation 110 can be followed by operation 120, "Contacting the carbon-containing polymeric material by light, heat or both to produce carbon aerogel." Operation 120 can be followed by optional operation 130, "Collecting the carbon aerogel."

In FIG. 1, operations 110-130 are illustrated as being performed sequentially with operation 110 first and operation 130 last. It will be appreciated however that these operations can be combined and/or divided into additional or different operations as appropriate to suit particular embodiments. For example, additional operations can be added before, during or after one or more of operations 110-130. In some embodiments, one or more of the operations can be performed at about the same time.

At operation 110, "Providing a carbon-containing polymeric material," the carbon-containing polymeric material can include a synthetic polymer, a natural polymer, or a combination thereof. The carbon-containing polymeric material can be in any shape and in any size. In some embodiments, the carbon-containing polymeric material can be in one piece or in multiple pieces.

The carbon-containing polymeric material can contain one or more synthetic polymers. The synthetic polymer can be any known synthetic polymers, including but not limited to, thermosets, thermoplastics, elastomers, and synthetic fibers. Non-limiting examples of synthetic polymers include epoxy resins, phenolic resins, urea resins, polypropylene, polystyrene, polyethylene, polyvinylchloride, polyamides, polyimides, polytetrafluoroethylene, any combinations thereof, and the like. In some embodiments, the carbon-containing polymeric material is a synthetic polymer. In some embodiments, the carbon-containing polymeric material is a mixture of two or more synthetic polymers. In some embodiments, the carbon-containing polymeric material is a synthetic polymer selected from epoxy resin, phenolic resin, urea resin, and a combination thereof.

The carbon-containing polymeric material can contain one or more natural polymers. The natural polymer can include any known natural carbon-containing polymeric materials. Non-limiting examples of natural polymers include carbohydrates and starches, cellulose, dextrans, lignins, polyamino acids, chitosan and chitin, natural oils, natural wax, and adhesion proteins. Examples of natural oils include, but are not limited to, camphor, castor oil, peppermint oil, eucalyptus oil, turpineol oil, coconut oil, garlic oil, turmeric oil, ginger oil, camphorwood oil, avocado oil, jojoba oil, almond oil, glycerides (mono- di- and triglycerides) derived from plant oils, pine oil, vegetable oils, fish oil, animal fats (for example, tallow and lard), and any mixtures thereof. In some embodiments, the natural polymer is camphor, castor oil, turpentine, or a mixture thereof. The hydrogenated derivatives of natural oils also are contemplated. In some embodiments, the carbon-containing polymeric material is a natural polymer. In some embodiments, the carbon-containing polymeric material is a mixture of two or more natural polymers. In some embodiments, the carbon-containing polymeric material is a natural polymer selected from camphor, castor oil, turpentine, and a combination thereof.

In some embodiments, the carbon-containing polymeric material includes a mixture of one or more synthetic polymers and one or more natural polymers. In some embodiments, the carbon-containing polymeric material is camphor, castor oil, resin, polypropylene, polystyrene, or a combination thereof. In some embodiments, the resin is epoxy resin, phenolic resin or a combination thereof.

At operation 120, "Contacting the carbon-containing polymeric material by light, heat or both to produce carbon aerogel," light, heat or both can be applied to the carbon-containing polymeric material. The light, heat or both can be applied to a portion of the carbon-containing polymeric material or to the entire carbon-containing polymeric material. In some embodiments, the light, heat or both can be applied to one or more surfaces of the carbon-containing polymeric material. In some embodiments, the light, heat or both can be applied to penetrate the surface or surfaces of the carbon-containing polymeric material. The light, heat or both can be applied continuously or at short segments separated by a certain period of time. Various parameters of the light, heat or both can be adjusted during the irradiation of the carbon-containing polymeric material to obtain the carbon aerogel. For example, the wavelength of the light, the power of the light or heat, the temperature of the heat can be adjusted. In some embodiments, the light, heat or both is applied to the carbon-containing polymeric material in a closed chamber enclosure. In some embodiments, the light, heat or both is applied to the carbon-containing polymeric material such that block flocculant powder is generated. Some, all, or none of the block flocculant powder may fly away, under the action of the airflow generated, from the surface of the carbon-containing polymeric material.

In some embodiments, operation 120, "Contacting the carbon-containing polymeric material by light, heat or both to produce carbon aerogel," includes irradiating the carbon-containing polymeric material with light. The wavelength of the light applied to the carbon-containing polymeric material is not particularly limited. For example, the light can have the wavelength of about 100 nm to about 11 µm. In some embodiments, the light can have the wavelength of about 100 nm, about 200 nm, about 100 nm, about 300 nm, about 500 nm, about 800 nm, about 1 µm, about 3 µm, about 5 µm, about 8 µm, about 10 µm, about 11 µm, or a wavelength between any two of these values. In some embodiments, the light has a wavelength of about 200 nm to about 11 µm. In some embodiments, the light has a wavelength of about 200 nm to about 10.6 µm.

In some embodiments, the carbon-containing polymeric material can be heated to various temperatures before or during the irradiating with light. The light can be applied to the carbon-containing polymeric material at various temperatures of the material, for example at least about 350° C. For example, the light can be applied to the carbon-containing polymeric material when the material is at a temperature of about 350° C., about 400° C., about 450° C., about 500° C., about 550° C., about 600° C., about 650° C., or a temperature between any two of these values. In some embodiments, the light can be applied to the carbon-containing polymeric material when the material is at a temperature of at least about 350° C., at least about 400° C., at least about 450° C., at least about 500° C., at least about 550° C., at least about 600° C., at least about 650° C., or a temperature between any two of these values. In some embodiments, the light is applied to the carbon-containing polymeric material when the material is at a temperature of about 350° C. to about 650° C.

In some embodiments, the irradiating with light results in the heating of the carbon-containing polymeric material to various temperatures. The carbon-containing polymeric material during irradiation by the light can have, for example, a temperature of at least about 350° C. In some embodiments, the carbon-containing polymeric material during irradiation by the light has a temperature of about 350° C., about 400° C., about 450° C., about 500° C., about 550° C., about 600° C., about 650° C., or a temperature between any two of these values. In some embodiments, the carbon-containing polymeric material during irradiation by the light has a temperature of at least about 400° C. In some embodiments, the carbon-containing polymeric material during irradiation by the light has a temperature of about 350° C. to about 650° C.

The time period that the light is applied to the carbon-containing polymeric material can also vary. For example, the light can be applied to the carbon-containing polymeric material for at least about 2 seconds. The light can be applied to the carbon-containing polymeric material for at least about 2 seconds, at least about 10 seconds, at least about 30 seconds, at least about 1 minute, at least about 2 minutes, at least about 5 minutes, at least about 10 minutes, at least about 20 minutes, at least about 30 minutes, at least about 45 minutes, or longer, or a time period between any two of these values. In some embodiments, the light is applied to the carbon-containing polymeric material for about 2 seconds, about 10 seconds, about 30 seconds, about 1 minute, about 5 minutes, about 10 minutes, about 20 minutes, about 30 minutes, about 45 minutes, about 60 minutes, or a time period between any of these two values. In some embodiments, the light is applied to the carbon-containing polymeric material for about 2 seconds to about 1 minute. In some embodiments, the light is applied to the carbon-containing polymeric material for at least about 12 minutes.

The source from where the light is produced is not particularly limited. In some embodiments, the light is a light beam produced by a laser. The type of laser that can be used in the methods disclosed herein is not particularly limited. Any known laser may be used in the methods disclosed herein. For example, the laser can be a carbon dioxide laser or an optical fiber laser. The power of the light beam produced from the laser can vary. For example, the power can be at least about 5 watts (W). In some embodiments, the light beam produced from the laser has a power of at least about 5 W, at least about 10 W, at least about 20 W, at least about 30 W, at least about 40 W, at least about 50 W, at least about 60 W, or a power between any two of these values. In some embodiments, the light beam produced from the laser has a power of about 50 W. In some embodiments, the light beam produced from the laser has a power of about 60 W.

In some embodiments, the light includes a focused beam of sunlight. The sunlight can be, for example, reflected sunlight, transmitted sunlight, or both. The focused beam of sunlight can be generated by any suitable means known to those of skill in the art. For example, the sunlight can be reflected and focused using a solar cooker. The power of the focused beam of sunlight can vary. For example, the power can be at least about 5 watts (W). In some embodiments, the focused beam of sunlight has a power of at least about 5 W, at least about 10 W, at least about 20 W, at least about 30 W, at least about 40 W, at least about 50 W, at least about 60 W, or a power between any two of these values. In some embodiments, the focused beam of sunlight has a power of about 50 W. In some embodiments, the focused beam of sunlight has a power of about 60 W.

In some embodiments, operation 120, "Contacting the carbon-containing polymeric material by light, heat or both to produce carbon aerogel," includes applying heat to the carbon-containing polymeric material. The heat can be supplied by a flame. The heat can be applied to the carbon-containing polymeric material to heat the material to various temperatures, for example at about 350° C. to about 650° C. For example, the heat can be applied to the carbon-containing polymeric material to heat the material to about 350° C., about 400° C., about 450° C., about 500° C., about 550° C., about 600° C., about 650° C., or a temperature between any two of these values. In some embodiments, the heat is applied to the carbon-containing polymeric material to heat the material to a temperature in a range of about 350° C. to about 650° C. The time period that the heat can be applied to the carbon-containing polymeric material can also vary. For example, the heat can be applied to the carbon-containing polymeric material for at least about 2 seconds. In some embodiments, the heat is applied to the carbon-containing polymeric material for about 2 seconds, about 5 seconds, about 10 seconds, about 20 seconds, about 30 seconds, about 1 minute, about 2 minutes, about 5 minutes, about 10 minutes, about 15 minutes, or a time period between any two of these values. In some embodiments, the heat is applied to the carbon-containing polymeric material for about 2 seconds to about 1 minute. In some embodiments, the heat is applied to the carbon-containing polymeric material for at least about 1 minute, at least about 2 minutes, at least about 5 minutes, or a time period between any two of these values. In some embodiments, the heat is applied to the carbon-containing polymeric material for at least about 10 minutes. Non-limiting examples of a source to produce a flame include blast burners, such as alcohol blast burners or gas blast burners.

In some embodiments, operation 120, "Contacting the carbon-containing polymeric material by light, heat or both to produce carbon aerogel," includes applying heat and light to the carbon-containing polymeric material. The heat and light can be applied to the carbon-containing polymeric material at the same time or separately. For example, the light and the heat can be applied continuously or at short segments separated by a certain period of time. The order in which the light and the heat are applied to the carbon-containing polymeric material is not particularly limited. In some embodiments, the carbon-containing polymeric material is contacted by light before being contacted by heat. In some embodiments, the carbon-containing polymeric material is contacted by heat before being contacted by light.

At optional operation 130, "Collecting the carbon aerogel," the carbon aerogel, for example block flocculant carbon aerogel powder, can be collected by any suitable means known to those of skill in the art. For example, the carbon aerogel can be collected from one or more sides (for example, sidewall, bottom and/or ceiling) of the compartment (for example, an enclosure with or without window) in which the carbon aerogel is produced using a brush. In some embodiments, the carbon aerogel is in powered form. For example, the carbon aerogel powder can be lightweight. In some embodiments, the carbon aerogel is in granular form. In some embodiments, the carbon aerogel is a mixture of powered and granular form. In some embodiments, the carbon aerogel powder and/or granules exhibit a substantial uniform particle size, a high specific surface area and a small density.

The carbon aerogel produced by the methods, systems, and kits disclosed herein can include carbon aerogel power, carbon aerogel granules, or a combination thereof. In some embodiments, the carbon aerogel is a carbon aerogel powder. The carbon aerogel powder or granules, in some embodiments, can include carbon nanoparticles. The average size of the carbon nanoparticles can vary, for example, from about 1 nm to about 100 nm. For example, the carbon nanoparticles can have an average size of about 1 nm, about 10 nm, about 20 nm, about 30 nm, about 35 nm, about 40 nm, about 45 nm, about 50 nm, about 55 nm, about 60 nm, about 65 nm, about 70 nm, about 75 nm, about 80 nm, about 90 nm, about 100 nm, or an average size between any two of these values. In some embodiments, the carbon nanoparticles have an average size of about 30 nm to about 75 nm. In some embodiments, the carbon nanoparticles have an average size of at least about 30 nm. In some embodiments, the carbon nanoparticles have an average size of not more than about 75 nm. In some embodiments, the carbon nanoparticles have an average size of about 50 to about 55 nm.

The carbon nanoparticles of the carbon aerogel power/granules produced by the methods disclosed herein can have a substantial uniform particle size. For example, at least about 40% of the carbon nanoparticles can have a size of about 1 nm to about 100 nm. In some embodiments, at least about 40%, at least about 50%, at least about 60%, at least about 70%, at least about 80%, at least about 90%, at least about 95%, at least about 99%, or a percentage between any two of these values, of the carbon nanoparticles have a size of about 1 nm to about 100 nm. In some embodiments, at least about 50%, at least about 60%, at least about 70%, at least about 80%, at least about 90%, at least about 95%, or more, or a percentage between any two of these values, of the carbon nanoparticles can have a size of about 30 nm to about 75 nm. In some embodiments, at least about 60% of the carbon nanoparticles have a size of about 30 nm to about 75 nm. In some embodiments, at least about 80% of the carbon nanoparticles have a size of about 30 nm to about 75 nm. In some embodiments, about 80% to about 98% of the carbon nanoparticles have a size of about 30 nm to 75 nm.

The carbon nanoparticles of the carbon aerogel power/granules produced by the methods disclosed herein can be porous or solid. For example, at least about 10% of the carbon nanoparticles can be porous carbon nanoparticles. In some embodiments, at least about 10%, at least about 20%, at least about 30%, at least about 40%, at least about 50%, at least about 60%, at least about 70%, at least about 80%, at least about 90%, at least about 95%, at least about 99%, or a percentage between any two of these values, of the carbon nanoparticles are porous carbon nanoparticles. In some embodiments, about 10%, about 20%, about 30%, about 40%, about 50%, about 60%, about 70%, about 80%, about 90%, about 95%, about 99%, or a percentage between any two of these values, of the carbon nanoparticles are porous carbon nanoparticles. In some embodiments, at least about 50% of the carbon nanoparticles are porous carbon nanoparticles. In some embodiments, at least about 60% of the carbon nanoparticles are porous carbon nanoparticles. In some embodiments, at least about 90% of the carbon nanoparticles are porous carbon nanoparticles. In some embodiments, about 80% to about 98% of the carbon nanoparticles are porous carbon nanoparticles.

The pore diameter of the porous carbon nanoparticles, can also vary, for example from about 0.5 nm to about 100 nm. For example, the average pore diameter of the porous carbon nanoparticles can be about 0.5 nm, about 1 nm, about 1.5 nm, about 2.5 nm, about 5 nm, about 8 nm, about 10 nm, about 20 nm, about 30 nm, about 40 nm, about 50 nm, about 75 nm, about 100 nm, or a an average pore diameter between any two of these values. In some embodiments, the porous carbon nanoparticles have an average pore diameter of at least about 1.5 nm. In some embodiments, the porous carbon nanoparticles have an average pore diameter of not more than about 50 nm. In some embodiments, the porous carbon nanoparticles have an average pore diameter of about 2.5 nm. In some embodiments, at least about 50% of the carbon nanoparticles have a pore diameter of about 1 nm to about 50 nm.

The surface area of the carbon aerogel power and granules can be determined by any known method, for example, the Brunauer-Emmett-Teller (BET) method. The surface area of the carbon aerogel power and granules can vary, for example, the BET surface area of the carbon aerogel power and/or granules can be from about 100 $m^2/g$ to about 3500 $m^2/g$. For example, the carbon aerogel power and/or granules can have a BET surface area of about 100 $m^2/g$, about 300 $m^2/g$, about 600 $m^2/g$, about 800 $m^2/g$, about 1000 $m^2/g$, about 1100 $m^2/g$, about 1500 $m^2/g$, about 2000 $m^2/g$, about 2500 $m^2/g$, about 3000 $m^2/g$, about 3500 $m^2/g$, or a BET surface area between any two of these values. In some embodiments, the carbon aerogel powder and/or granules has a BET surface area of about 600 m$^2$/g to about 1100 m$^2$/g. In some embodiments, the carbon aerogel powder and/or granules has a BET surface area of not more than about 3000 m$^2$/g.

The bulk density of the carbon aerogel power and/or granules can also vary, for example, from about 1 mg/cm$^3$ to about 20 mg/cm$^3$. For example, the bulk density of the carbon aerogel power and/or granules can be about 1 mg/cm$^3$, about 3 mg/cm$^3$, about 6 mg/cm$^3$, about 8 mg/cm$^3$, about 10 mg/cm$^3$, about 15 mg/cm$^3$, about 20 mg/cm$^3$, about 25 mg/cm$^3$, about 30 mg/cm$^3$, or a bulk density between any two of these values. In some embodiments, the carbon aerogel powder and/or granules have a bulk density of about 6 mg/cm$^3$.

Also disclosed is carbon aerogel, such as carbon aerogel power and granules, produced by the methods disclosed herein.

Systems and Kits for Producing Carbon Aerogel

Systems and kits for producing carbon aerogel are also disclosed. In some embodiments, the system includes at least one energy source configured to emit light, heat or both; and an enclosure configured to receive at least one carbon-containing polymeric material, and light, heat or both from the energy source to expose the at least one carbon-containing polymeric material to the light, heat or both. In some embodiments, the at least one energy source can be external to the enclosure, and the enclosure may include at least one surface that is transmissive to the light, heat or both from the energy source. In some embodiments, the at least one energy source may reside within the enclosure. As disclosed herein, the carbon-containing polymeric material can include one or more synthetic polymers, one or more natural polymers, or any mixture thereof. In some embodiments, the at least one carbon-containing polymeric material includes a synthetic polymer, a natural polymer, or a combination thereof. In some embodiments, the at least one carbon-containing polymeric material include a synthetic polymer selected from epoxy resin, phenolic resin, urea resin, and a combination thereof. In some embodiments, the at least one carbon-containing polymeric material may be selected from camphor, castor oil, turpentine, and a combination thereof. In some embodiments, the at least one carbon-containing polymeric material includes camphor, castor oil, resin, polypropylene, polystyrene, or a combination thereof. Non-limiting examples of the resin include epoxy resin, phenolic resin and a mixture thereof.

As disclosed herein, in some embodiments, the at least one energy source configured to emit light, heat or both includes a laser, sunlight, a blast burner, or a combination thereof. The laser can, for example, be a carbon dioxide laser or an optical fiber laser. In some embodiments, the blast burner is a gas blast burner or an alcohol blast burner.

The kits for producing carbon aerogel, such as carbon aerogel, in some embodiments, can include at least one energy source configured to emit light, heat or both; an enclosure containing at least one carbon-containing polymeric material, the enclosure configured to receive light, heat or both from the energy source to expose the at least one carbon-containing polymeric material to the light, heat or both; and instructions for contacting the at least one carbon-containing polymeric material with the light, heat or both to produce the carbon aerogel. In some embodiments, the at least one energy source can be external to the enclosure, and the enclosure may include at least one surface that is transmissive to the light, heat or both from the energy source. In some embodiments, the at least one energy source may reside within the enclosure. As disclosed herein, the carbon-containing polymeric material can include one or more synthetic polymers, one or more natural polymers, or any mixture thereof. In some embodiments, the at least one carbon-containing polymeric material includes a synthetic polymer, a natural polymer, or a combination thereof. In some embodiments, the at least one carbon-containing polymeric material includes a synthetic polymer selected from epoxy resin, phenolic resin, urea resin, and a combination thereof. In some embodiments, the at least one carbon-containing polymeric material includes a natural polymer selected from camphor, castor oil, turpentine, and a combination thereof. In some embodiments, the at least one carbon-containing polymeric material includes camphor, castor oil, resin, polypropylene, polystyrene, or a combination thereof. Non-limiting examples of the resin include epoxy resin, phenolic resin, and a mixture thereof. As disclosed herein, in some embodiments, the at least one energy source configured to emit light, heat or both, includes a laser, sunlight, a blast burner, or a combination thereof. The laser can, for example, include a carbon dioxide laser or an optical fiber laser. In some embodiments, the blast burner is a gas blast burner or an alcohol blast burner. The instructions that form part of the kit can include method steps as disclosed herein for producing the carbon aerogel.

EXAMPLES

Additional embodiments are disclosed in further detail in the following examples, which are not in any way intended to limit the scope of the claims.

Example 1

Figure 2A:
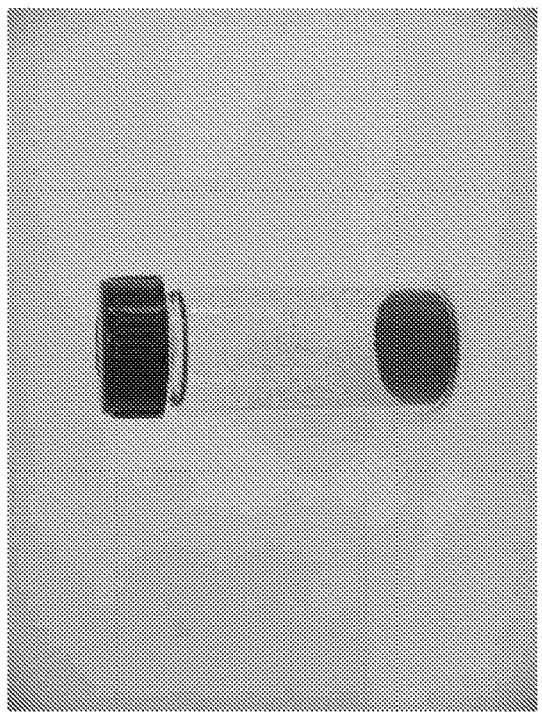
FIGS. 2A and 2B are digital photographs of carbon aerogel powder produced by applying a carbon dioxide laser to camphor.
Figure 2B:
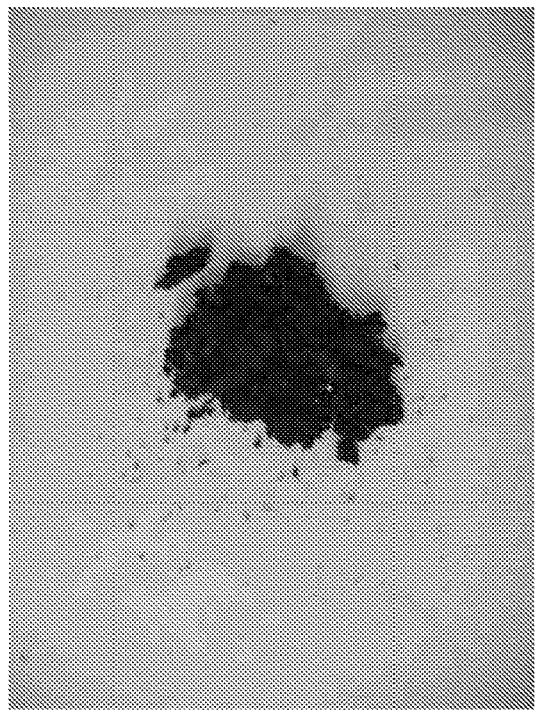

Preparation of Carbon Aerogel Powder Using a Carbon Dioxide Laser 10 g of camphor was placed in a closed chamber enclosure. The size of the enclosure was 0.5 m in length, 0.5 m in width and 0.5 m in height. The enclosure has a small window for allowing light through. The surfaces of the polymer (camphor) were irradiated with light from a carbon dioxide laser for 20 minutes and at a power of at least 50 W, thereby producing carbon aerogel as a block flocculant black powder. Block flocculent powder that flew away from the surface of the polymer (camphor) was collected from the sidewall and from the bottom of the enclosure using a brush. Digital photographs of the resulting carbon aerogel are depicted in FIGS. 2A and 2B. As shown in FIGS. 2A and 2B, the carbon aerogel that was prepared was in the form of powder or granules. It is expected that the carbon aerogel will exhibit uniform particle size, uniform pore size, high specific surface area, and small density.

Example 2

Figure 3B:
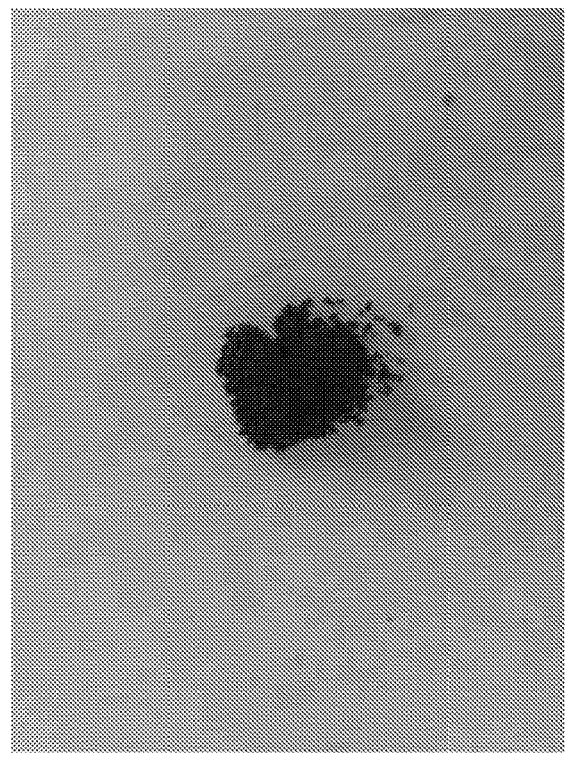
FIGS. 3A and 3B are digital photographs of carbon aerogel powder produced by applying a flame from a blast burner to epoxy resin.
Figure 3A:
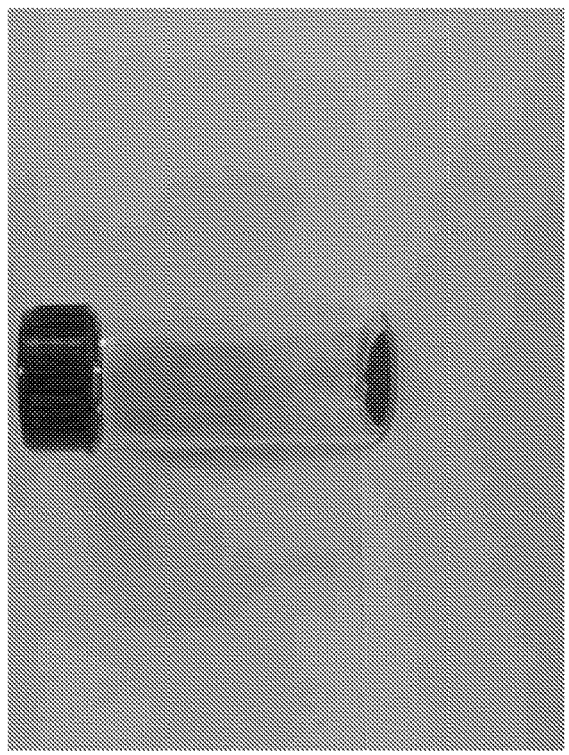
Figure 4B:
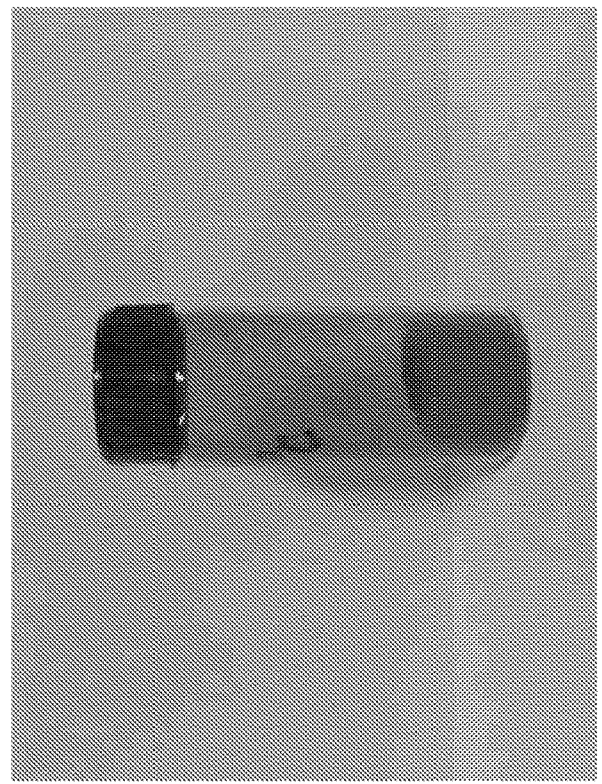
FIGS. 4A, 4B, 5A, and 5B are digital photographs of carbon aerogel powder produced from an epoxy resin by irradiation with a focused beam of sunlight.
Figure 4A:
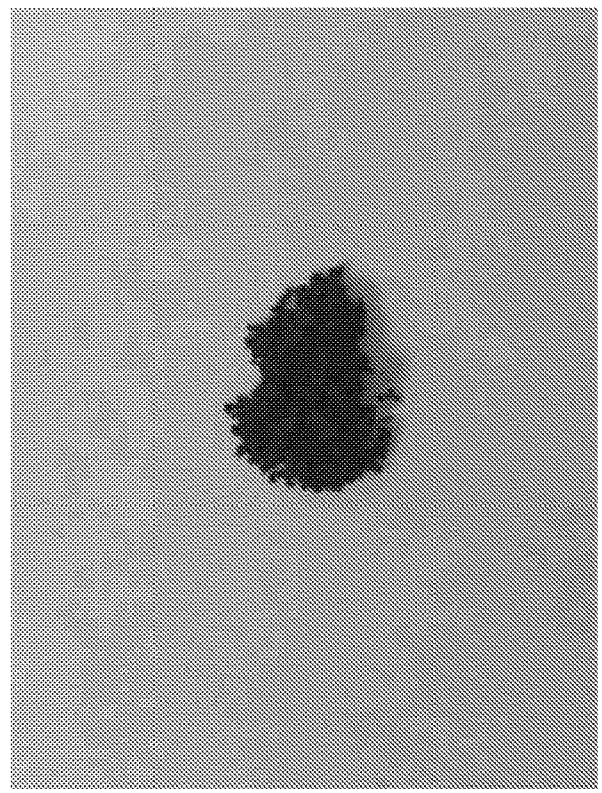
Figure 5B:
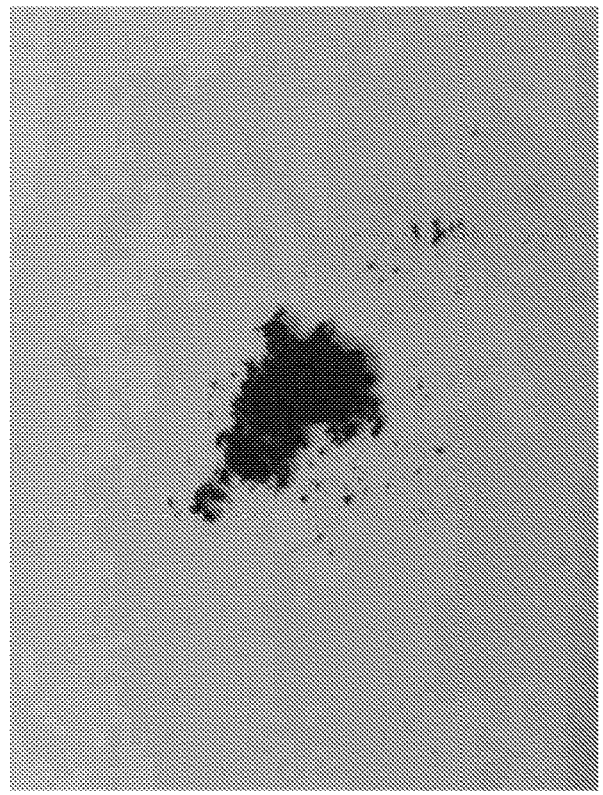
Figure 5A:
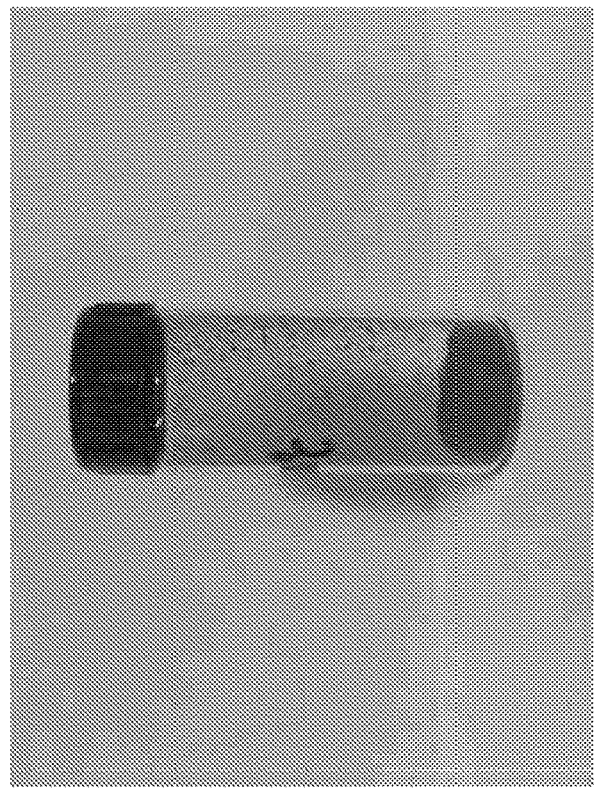

Preparation of Carbon Aerogel Powder Using a Blast Burner 20 g of epoxy resin was placed in a closed chamber enclosure. The size of the enclosure was 0.5 m in length, 0.5 m in width and 0.5 m in height. The surfaces of the polymer (epoxy resin) were heated by flame from a blast burner for 10 minutes and at about 500° C., thereby producing carbon aerogel as a block flocculant black powder. Block flocculent powder that flew away from the surface of the polymer (epoxy resin) was collected from the sidewall and from the bottom of the enclosure using a brush. Digital photographs of the resulting carbon aerogel are depicted in FIGS. 3A and 3B. As shown in FIGS. 3A and 3B, the carbon aerogel that was prepared was in the form of powder or granules. It is expected that the carbon aerogel will exhibit uniform particle size, uniform pore size, high specific surface area, and small density.

Example 3

Preparation of Carbon Aerogel Powder Using an Optical Fiber Laser 10 g of polystyrene was placed in a closed chamber enclosure having a small window for allowing light through. The size of the enclosure was 0.5 m in length, 0.5 m in width and 0.5 m in height. The surfaces of the polymer (polystyrene) were irradiated with light from an optical fiber laser for 15 minutes and at a power of 60 W, thereby producing carbon aerogel as a block flocculant black powder. Block flocculent powder that flew away from the surface of the polymer (polystyrene) was collected from the sidewall and from the bottom of the enclosure using a brush. The carbon aerogel that was prepared was in the form of powder or granules. It is expected that the carbon aerogel will exhibit uniform particle size, uniform pore size, high specific surface area, and small density.

Example 4

Preparation of Carbon Aerogel Powder Using Focused Sunlight 15 g of epoxy resin was placed in a closed chamber enclosure having a small window for allowing light through. The size of the enclosure was 0.5 m in length, 0.5 m in width and 0.5 m in height. The surfaces of the polymer (epoxy resin) were irradiated with focused sunlight (using solar cooker) for 15 minutes, thereby producing carbon aerogel as a block flocculant black powder. The temperature of the polymer (epoxy resin) under the irradiation was about 450° C. to 600° C. Any block flocculant powder that flew away from the surface of the polymer (epoxy resin) was collected from the sidewall and from the bottom of the enclosure using a brush. Digital photographs of the resulting carbon aerogel are depicted in FIGS. 4A and 4B and FIGS. 5A and 5B. As shown in FIGS. 4A, 4B, 5A and 5B, the carbon aerogels that were prepared were in the form of powder or granules. As demonstrated by Example 5 below, the carbon aerogels exhibited uniform particle size, uniform pore size, high specific surface area, and small density.

The same procedure was carried out using 10 g of phenolic resin. Digital photographs of the resulting carbon aerogel are depicted in FIGS. 6A and 6B.

Figure 6B:
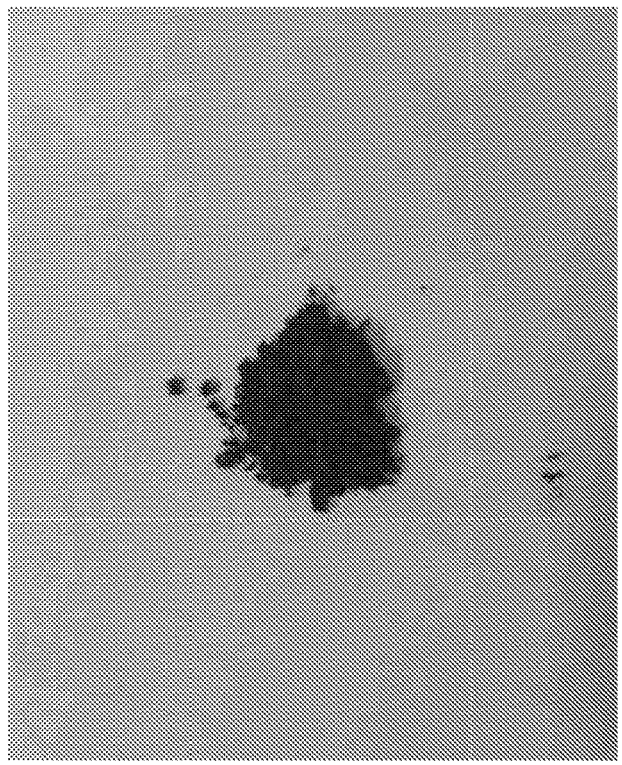
FIGS. 6A and 6B are digital photographs of carbon aerogel powder produced from phenolic resin by irradiation with a focused beam of sunlight.
Figure 6A:
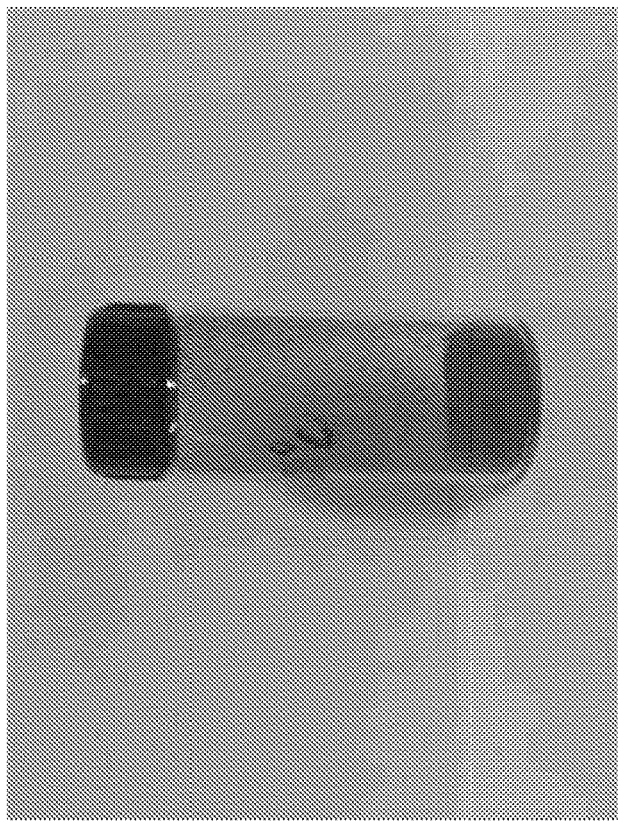

The digital photographs in FIGS. 6A and 6B show that the prepared carbon aerogel was in powder or granule form. It is expected that the carbon aerogel will exhibit uniform particle size, uniform pore size, high specific surface area, and small density.

Example 5

Characteristics of the Carbon Aerogel Powder Prepared by Irradiating with Focused Sunlight Carbon aerogel powder was prepared by irradiating an epoxy resin with impurity of less than 0.01% by weight with focused sunlight according to the procedure described in Example 4. The prepared carbon aerogel powder was analyzed using the Brunauer-Emmett-Teller (BET) method, a scanning electron microscopy (SEM), transmission electron microscopy (TEM) and electrochemical performance tests. The results are shown in FIGS. 7-10, respectively.

Figure 7:
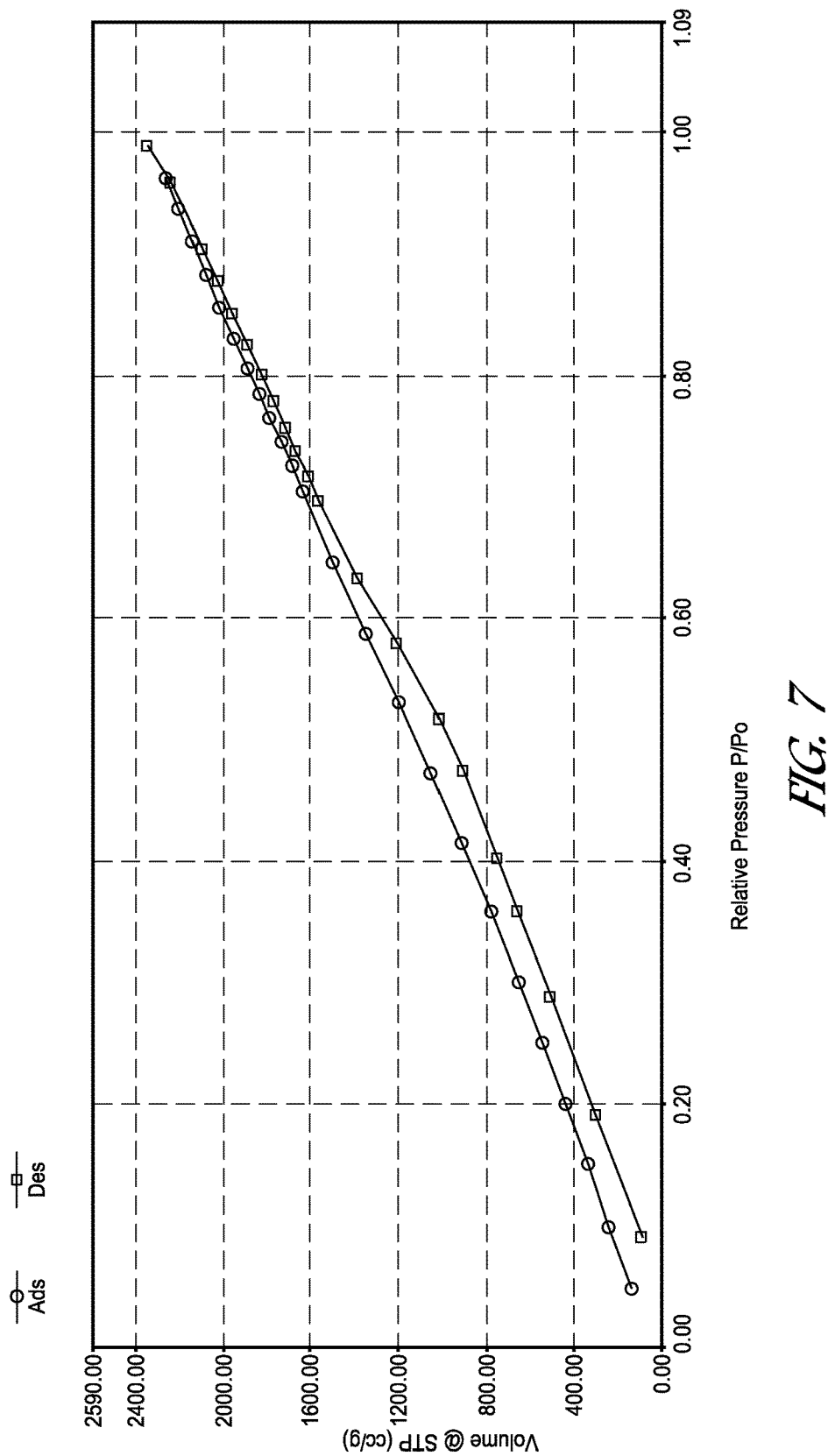
FIG. 7 is a plot showing the adsorption-desorption profile of carbon aerogel powder produced by irradiating epoxy resin with a focused beam of sunlight.
Figure 8:
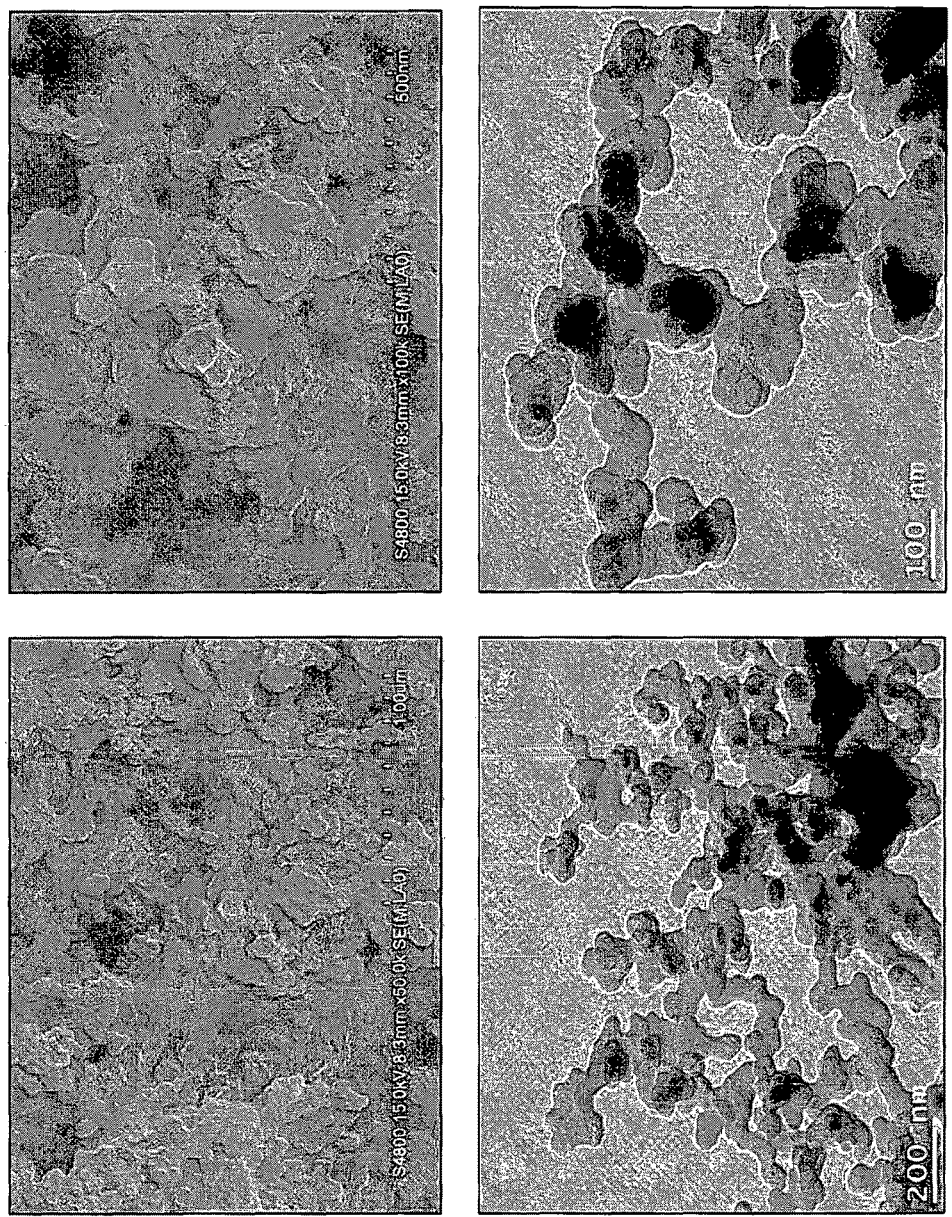
FIG. 8 are scanning electron microscope (SEM) and transmission electron microscopy (TEM) images of carbon aerogel powder produced by irradiating epoxy resin with a focused beam of sunlight.
Figure 9:
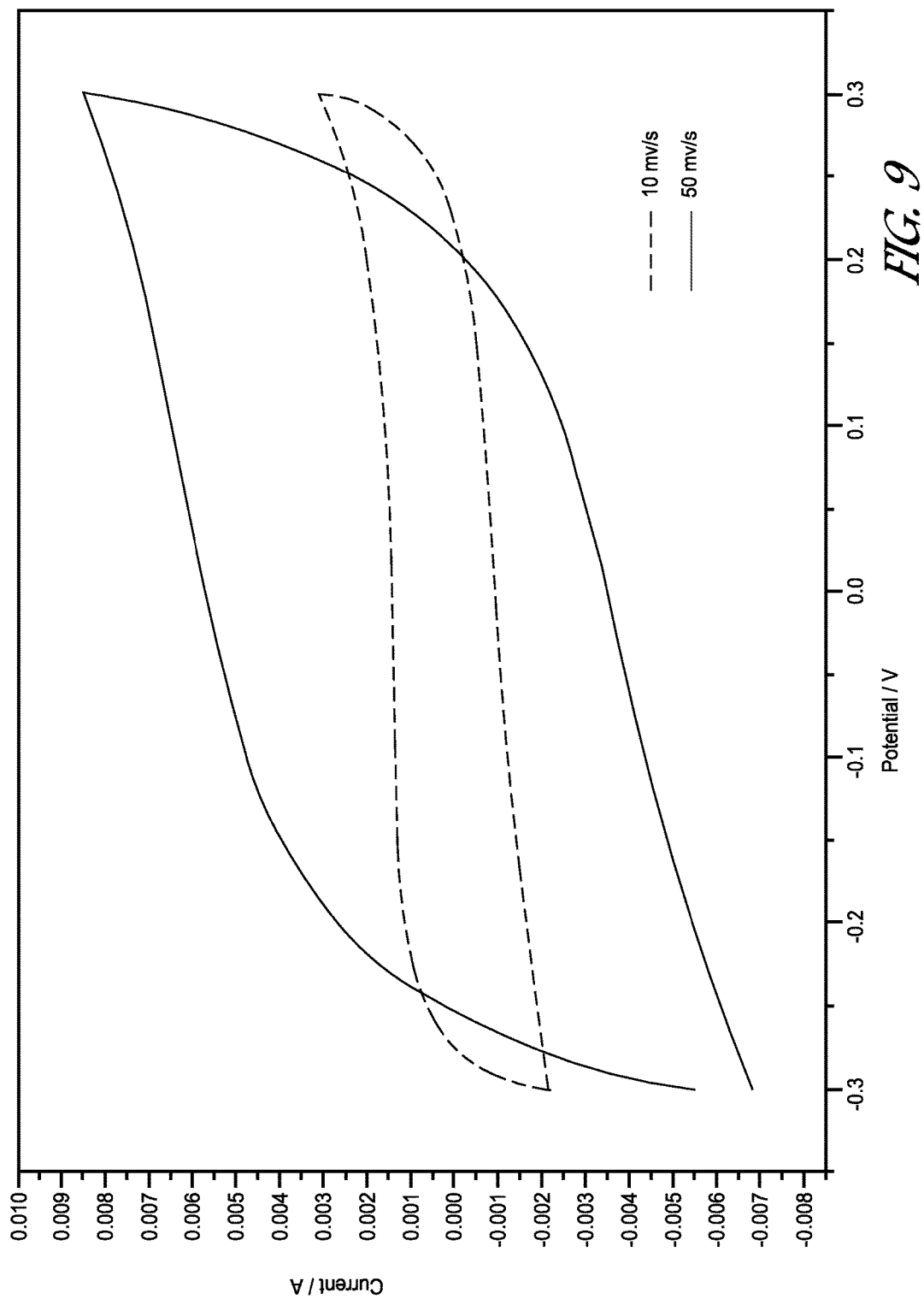
FIG. 9 is a plot showing the results of an electrochemical test of carbon aerogel produced by irradiating epoxy resin with a focused beam of sunlight.
Figure 10:
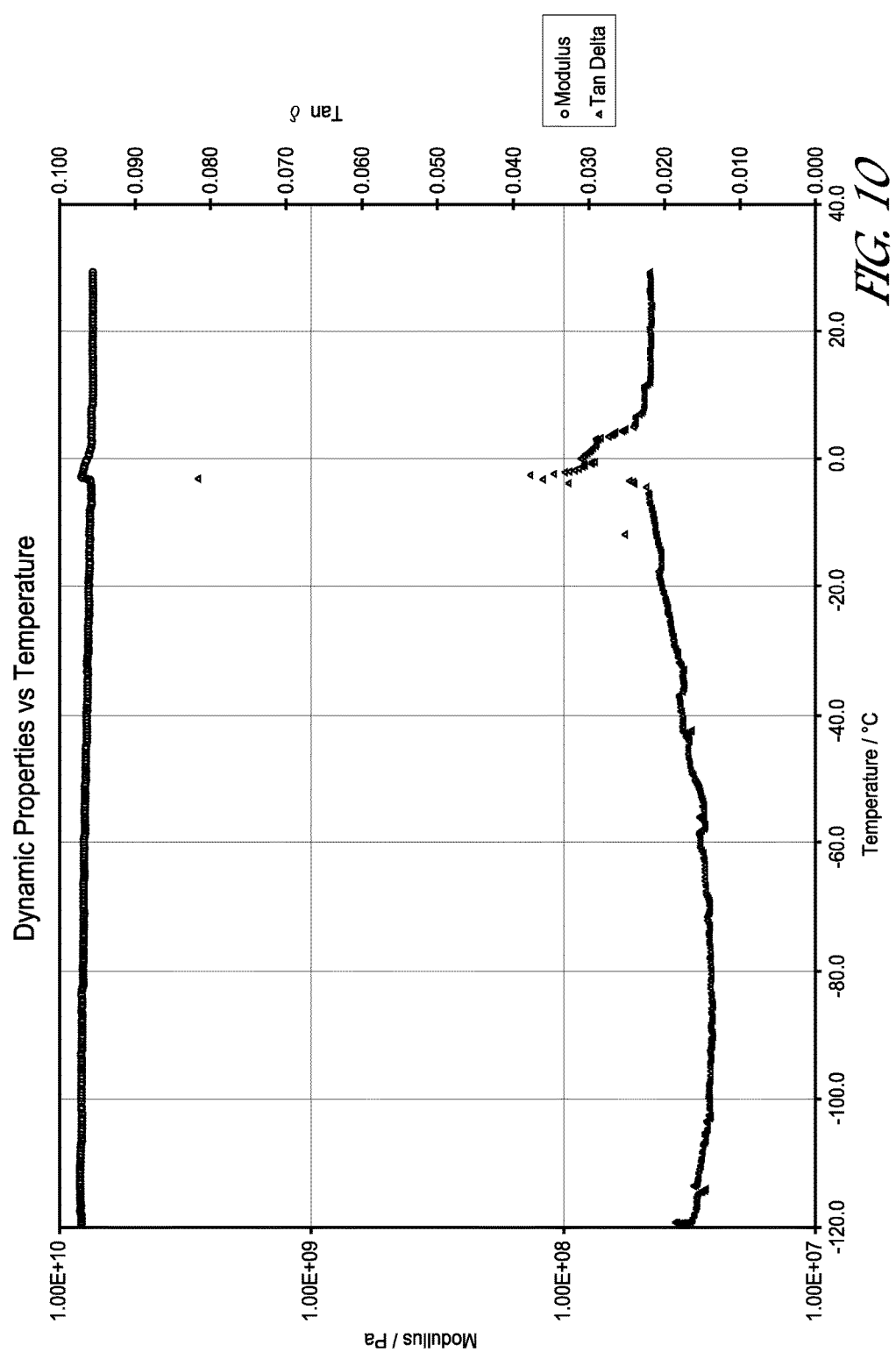
FIG. 10 depicts the Dynamic Mechanical Analysis of a sample carbon aerogel powder.

As shown in the SEM and TEM images of FIG. 8, the carbon aerogel power obtained from epoxy resin is in nanopowder form having a substantially uniform particle size (about 60 nm). The BET tests indicated a bulk density of 6 mg/cm$^3$, and FIG. 7 depicts the adsorption-desorption profile of the carbon aerogel powder (its specific surface area is calculated to be up to 3,000 m$^2$/g) from the BET tests. FIG. 9 depicts the results of an electrochemical test of the carbon aerogel powder. According to FIG. 9, the carbon aerogel exhibited good electrochemical performance. FIG. 10 depicts the Dynamic Mechanical Analysis of the sample, showing a high Young's Modulus (approaching 10 GPa) and a low Tan Delta (smaller than 0.03), thereby demonstrating the structural stability of the carbon aerogel with respect to changes in temperature.

Figure 11:
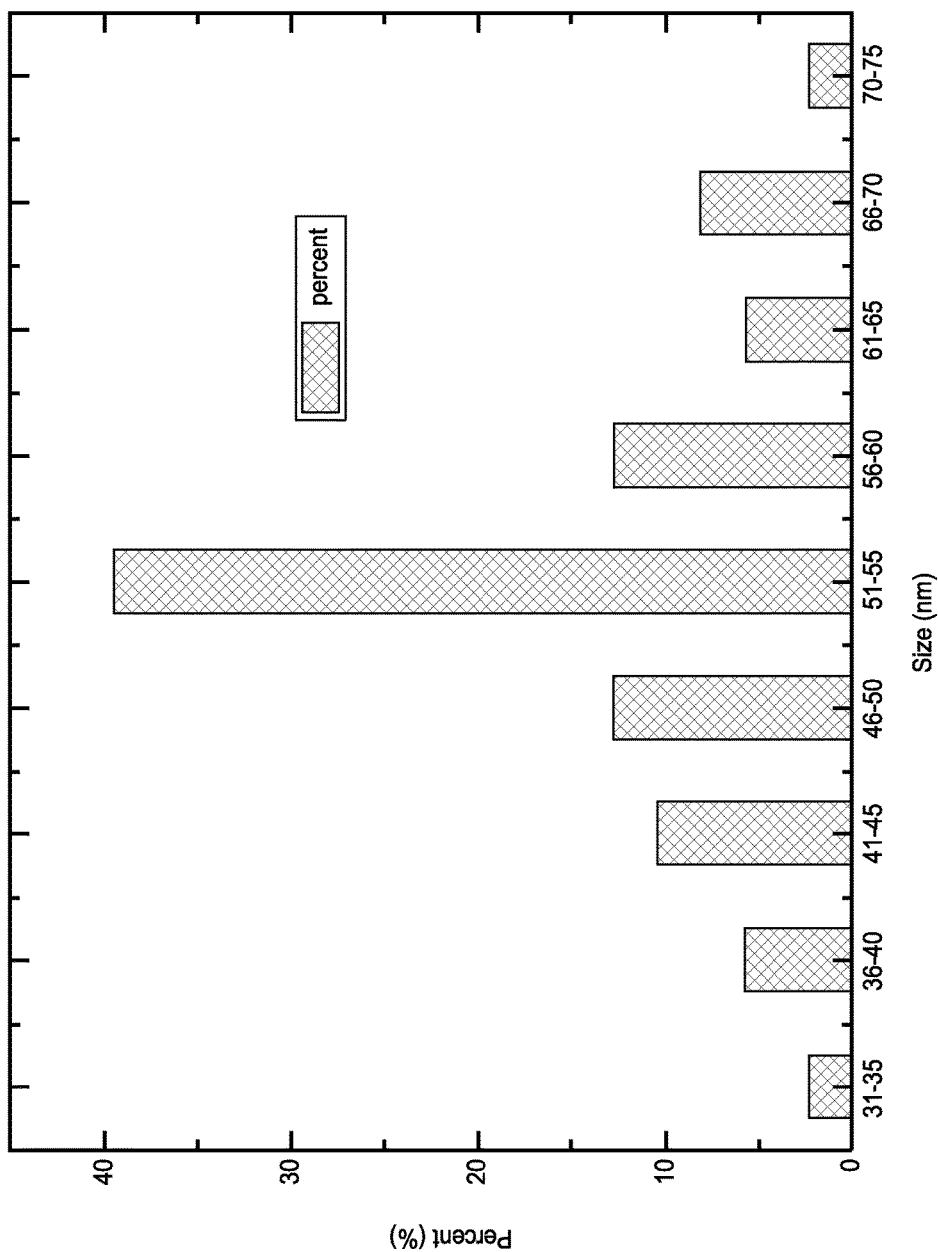
FIG. 11 is a histogram showing particle size distribution of a sample carbon aerogel powder.
Figure 12:
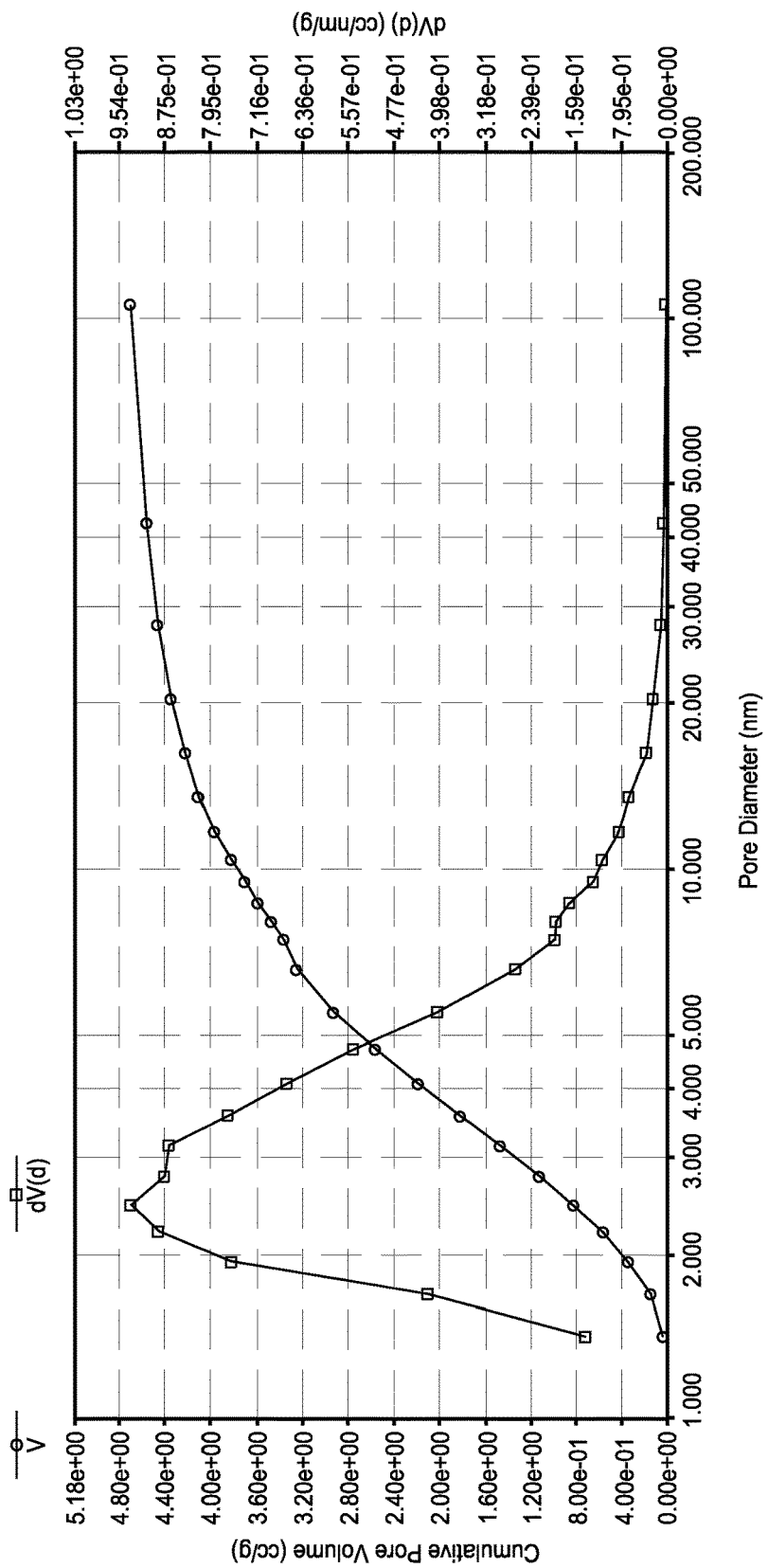
FIG. 12 is a plot showing pore size distribution of a sample carbon aerogel powder.

Eighty-six samples of particles (as shown in FIG. 8) were used to measure particle and pore size distributions. The results are shown in FIGS. 11 and 12, respectively. According to FIGS. 11 and 12, the carbon aerogel exhibited substantially uniform particle size and narrow size distribution.

This example shows that the method disclosed herein can produce carbon aerogel powder with substantially uniform particle size, uniform pore size, high specific surface area, and small density.

With respect to the use of substantially any plural and/or singular terms herein, those having skill in the art can translate from the plural to the singular and/or from the singular to volume of wastewater can be received in the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

What is claimed is:

1. A method of producing carbon aerogel, the method comprising:
   providing a carbon-containing polymeric material;
   exposing the carbon-containing polymeric material to at least one of light or heat selected to produce a carbon aerogel powder; and
   collecting the produced carbon aerogel powder,
   wherein the produced carbon aerogel powder comprises carbon nanoparticles, and wherein the carbon aerogel powder has a porous structure with an average pore diameter of about 2.5 nm.

2. The method of claim 1, wherein the carbon-containing polymeric material comprises a synthetic polymer, a natural polymer, or a combination thereof.

3. The method of claim 1, wherein the carbon-containing polymeric material comprises an epoxy resin, a phenolic resin, a urea resin, camphor, castor oil, turpentine, a polypropylene, a polystyrene, or a combination thereof.

4. The method of claim 1, further comprising raising a temperature of the carbon-containing polymeric material to about 350° C. to about 650° C. when the carbon-containing polymeric material is exposed to light.

5. The method of claim 1, wherein exposing the carbon-containing polymeric material to light comprises irradiating the carbon-containing polymeric material with the light for about 2 seconds to about 1 minute.

6. The method of claim 1, wherein the light comprises a light beam produced by a laser that has a power of at least about 5 W.

7. The method of claim 6, wherein the light beam has a wavelength of about 200 nm to about 11 μm.

8. The method of claim 1, wherein the light comprises a focused beam of sunlight.

9. The method of claim 1, wherein exposing the carbon-containing polymeric material to heat comprises heating the carbon-containing polymeric material for at least 10 minutes.

10. The method of claim 1, wherein exposing the carbon-containing polymeric material to heat comprises heating the carbon-containing polymeric material for about 2 seconds to 1 minute.

11. The method of claim 1, wherein the carbon nanoparticles have an average size of about 30 nm to about 75 nm.

12. The method of claim 1, wherein the carbon nanoparticles have an average size of about 50 nm to about 55 nm.

13. The method of claim 1, wherein at least about 60% of the carbon nanoparticles have a size of about 30 nm to about 75 nm.

14. The method of claim 1, wherein at least about 50% of the carbon nanoparticles are porous carbon nanoparticles.

15. The method of claim 14, wherein the porous carbon nanoparticles have an average pore diameter of at least about 1.5 nm and not more than about 50 nm.

16. The method of claim 1, wherein the carbon aerogel powder has a BET surface area of about 600 $m^2/g$ to about 1100 $m^2/g$.

17. The method of claim 1, wherein the carbon aerogel powder has a bulk density of about 6 $mg/cm^3$.

18. A method of producing carbon aerogel, the method comprising:

providing a carbon-containing polymeric material including at least one of an epoxy resin, a phenolic resin, a urea resin, camphor, castor oil, turpentine, a polypropylene, or a polystyrene;

exposing the carbon-containing polymeric material to at least one of light or heat selected to produce the carbon aerogel; and collecting the produced carbon aerogel, wherein the carbon aerogel powder has a porous structure with an average pore diameter of about 2.5 nm.

19. The method of claim 18, wherein exposing the carbon-containing polymeric material to the at least one of light or heat produces carbon aerogel including a carbon aerogel powder that includes carbon nanoparticles.

20. The method of claim 19, wherein the carbon nanoparticles have an average size of about 30 nm to about 75 nm.

21. The method of claim 19, wherein the carbon nanoparticles have an average size of about 50 nm to about 55 nm.

* * * * *